United States Patent Office

2,740,688
Patented Apr. 3, 1956

2,740,688
FIXING COMPOSITION

Edward S. Chapin, Marblehead, and John R. Markgren, Boston, Mass.; said Markgren assignor to W. C. Durfee Company, Incorporated, Boston, Mass., a corporation of Massachusetts No Drawing. Application March 29, 1952,
Serial No. 279,454

10 Claims. (Cl. 8—75)

This invention relates to a novel fixing composition for use in, and also to a novel method of, after-treating dyed materials to fix the colors.

One object of the invention is to provide a novel and efficient fixing composition which may be used for all of the purposes for which the fixing compositions forming the subject matter of the Chapin-Durfee United States Patent No. 2,090,366, have been used, and which, in addition, may be used to produce aqueous solutions free from precipitates and of a wide range of concentrations, thus extending the field of usefulness to processes and for use in dyeing apparatus where the aforesaid patented fixing compositions for various reasons, as will be explained, cannot be successfully used.

A further object of the invention is to produce fixing solutions of novel composition free from precipitates and which may be used with advantage in the present-day rapidly operating dyeing processes, as for example, that practiced in continuous dyeing and other machines.

A still further object of the invention is to provide a novel process by which dyed materials, especially dyed union materials, may be treated to fix the colors in an extremely rapid, practical and economical manner and which lends itself particularly to practice in present-day commercial continuous dyeing machines.

With these general objects in view and such others as may hereinafter appear, the invention consists in the process of after-treating dyed materials to fix the colors in the novel fixing compositions and in the novel fixing solutions hereinafter described and particularly defined in the claims at the end of this specification.

The after-treatment of dyed materials in order to render the colors fast to water, to wet hot pressing against white fabrics, sometimes to perspiration, and to other conditions involving the action of water, steam and saline solutions, in accordance with the procedure and utilizing the fixing compositions forming the subject matter of the United States patent to Edward S. Chapin and Walter C. Durfee, No. 2,090,396, issued August 17, 1937, has met with a substantial commercial success throughout the textile industry.

Briefly, the aforesaid Chapin-Durfee patent, No.2,090,-396, was primarily concerned with the provision of a fixing composition comprising essentially aluminum sulphate or equivalent salt together with an acid binder, such as calcium acetate or sodium acetate, together with a shade balancer, such as basic sulphate of chromium, and in addition, the patent recommends the use of small proportions of tartrates, such as argol, together with substantial amounts of common salt. In the commercial use of the fixing composition disclosed in said Patent No. 2,090,396, the dyeing operations and the fixing operations were conducted in the regulation commercial dye kettle. In such a process the goods were first dyed in the commercial dye kettle, then washed and then fixed in the same kettle by the addition of the patented fixing composition which, as above described, consisted essentially of aluminum sulphate modified with calcium or sodium acetate and preferably containing a shade balancer together with an assistant, such as argol. During the fixing operation the concentration approximated one part of fixing composition to 600 parts of water, and the time consumed in the fixing usually varied form 15 to 20 minutes.

A new set of conditions arises when it is required to practice the fixing of the colors in the high-speed equipment of textile mills. For example, in a continuous dyeing machine of the type now in more or less general use, the goods are ordinarily run rapidly through the machine at speeds varying from 20 to 100 yards a minute more or less, and consequently, the period of time which is available for performing the fixing operations is very brief, varying from 15 to 20 seconds. In addition, the fixing composition in the degree of dilution heretofore used in dye kettles has been found to have little or no effect in fixing dyed or printed cloth during the 15 or 20-second passage of the goods through the fixing bath. In endeavoring to adapt the prior patented fixing compositions and the prior practice to the different conditions in the high-speed equipment as in, for example, a continuous dyeing machine, it has been found necessary to increase the concentration of the fixing composition in the fixing liquor approximately 10 to 20 times, but this increase in the concentration of the fixing composition in the fixing liquor was found to cause precipitates to be formed in such an amount and to such an extent as to render impractical the use of such patented fixing compositions in the present-day high-speed dyeing equipment.

The precipitates which were formed when it was attempted to use the patented fixing compositions in the present-day high-speed dyeing machines comprise calcium sulphate and either aluminum hydroxide or a basic aluminum salt. The substitution of potassium or sodium acetate for the calcium acetate of the patented fixing composition was found to successfully overcome the precipitation of calcium sulphate. However, the problem of eliminating the tendency of the salts of aluminum in solution to hydrolyze and to produce the precipitated aluminum hydroxide or basic aluminum salt, while at the same time producing a fixing solution which when used would not alter the shade of the large number of the delicate dyes which present-day commercial dyeing practice requires, was not easy of solution. Any of the usual solubilizing agents, such as bitartrate of potash and the stronger acids could not be used without detracting from the effectiveness of the fixing composition, or changing the shade, or both, and consequently, such agents afforded no solution to the problem.

After considerable research we have discovered that by the addition of boric acid it is possible to produce fixing solutions wherein the tendency of the aluminum salts to hydrolyze and produce precipitates was overcome, and further, that even when used in relatively large proportions the boric acid did not reduce the fixing power of the fixing salt nor appreciably alter the shade of any of the dyeings being fixed. Accordingly, the present invention contemplates a fixing composition comprising aluminum sulphate or its equivalent, a modified sodium or potassium acetate and an amount of boric acid sufficient to prevent the formation of precipitates in an aqueous solution of the fixing composition over wide ranges of concentrations.

The following examples illustrate the preferred fixing compositions embodying the present invention:

(1)

| | |
|---|---|
| Aluminum sulphate | 75.0 |
| Sodium acetate anhydride | 21.0 |
| Boric acid | 4.0 |
| | 100.0 |

(2)

| | |
|---|---|
| Aluminum sulphate | 71.5 |
| Sodium acetate anhydride | 26.5 |
| Boric acid | 2.0 |
| | 100.0 |

(3)

| | |
|---|---|
| Aluminum sulphate | 57.0 |
| Sodium acetate anhydride | 41.0 |
| Boric acid | 2.0 |
| | 100.0 |

(4)

| | |
|---|---|
| Aluminum sulphate | 54.0 |
| Sodium acetate anhydride | 39.0 |
| Boric acid | 7.0 |
| | 100.0 |

(5)

| | |
|---|---|
| Aluminum sulphate | 34.0 |
| Sodium acetate anhydride | 60.0 |
| Boric acid | 6.0 |
| | 100.0 |

The ranges of the proportions within which satisfactory results may be secured are as follows:

Aluminum sulphate_____ From 80 to 30 parts by weight.
Sodium or potassium acetate
　　　　　　　　　　　From 20 to 60 parts by weight.
Boric acid_____ From 1 to 20 parts by weight.

The solubilizing action of boric acid is illustrated as follows: A solution of fixing composition, composed of fifty-eight parts of aluminum sulphate and forty-two parts of sodium acetate (which is essentially aluminum acetate in solution) of a concentration of one part in 25, will start to hydrolyze in a few hours. If to this fixing composition, two parts of boric acid are added, and the whole is dissolved, as above stated, at a concentration of one part to 25, the formation of a precipitate is prevented and the solution remains clear, without precipitation indefinitely. We have called this discovery the "boric acid effect."

The chemical reason for the solubilizing action of boric acid is difficult to explain. It might be assumed to be due to concentration of H ions from the ionization of boric acid in solution. However, the dissociation constant of boric acid is very small, $5.5 \times 10^{-10}$ at $25°$ C., and accordingly, the concentration of the H ions would seem to be quite negligible. Furthermore, it has been found that acids of the same order of dissociation, such as phenol (carbolic acid), hydroquinone and resorcinol have no appreciable solubilizing effect on the fixing compositions as above described. The solubilizing action of boric acid must be due to some as yet unexplained chemical fact.

Further consideration of the modus operandi of the continuous dyeing machine, will reveal the necessity of a perfectly soluble fixing composition to practice satisfactorily in this apparatus the fixing of the dyed materials. The printed or dyed material (before entering into the fixing bath) is passed through a wash box or boxes, to remove surplus dye. Although there are squeeze rolls between the wash box or boxes and the fixing liquor box, a certain amount of water is carried by the cloth from the wash box into the fixing box, thus diluting the liquor in the fixing box. Furthermore, the cloth as it leaves the fixing bath, in spite of squeeze rolls, carries out a certain amount of the fixing liquor. To compensate for these two disturbing factors, there is fed into the fixing box a solution of the fixing composition, stronger than the concentration of the solution of the fixing composition in the fixing box. The concentration of the feed liquor is such as to keep at a uniform concentration the solution in the fixing bath and the feeding is regulated to maintain the volume of liquor in the fixing box at a constant level.

The formation of a precipitate in the fixing box or the feed liquor affects the fixing and in a machine designed to run all day and/or night, soon fouls up the whole operation.

The addition of boric acid to the fixing composition yields a composition which dissolves to a complete solution, and the solution remains clear without precipitation indefinitely. This enables satisfactory operation of and fixing in a continuous dyeing machine.

In practicing the present invention, the dyed materials, and especially the dyed union materials, are subjected to treatment with a fixing solution embodying the present invention as above described. It is preferable to apply the soluble fixing compositions at a low temperature, i. e., 70° F., about the temperature of ordinary supply water in summer. A higher temperature, 90°–100° F., can be employed and is advisable with certain fabrics difficult to penetrate. However, as the temperature is increased, the tendency to hydrolysis is accelerated. The concentration of the fixing solution preferably lies within the range of from 1 part of fixing composition to 10 parts of water to 1 part of fixing composition to 100 parts of water. Within this range of concentrations, the dyed material may be satisfactorily fixed in an extremely short period of time in the order of from 10 to 15 seconds and without experiencing difficulty with either precipitated calcium sulphate or precipitated aluminum hydroxide or basic aluminum salts, and as a result, the fixing operation may be practiced in any of the present-day commercial continuous dyeing machines as well as in the apparatus and for the purposes for which the prior fixing compositions forming the subject matter of the Chapin-Durfee U. S. patent above referred to have been used.

As set forth in the aforesaid Chapin and Durfee Patent No. 2,090,396, the ease of fixing colors varies greatly with the dyes. Thus, the dyeings of the Direct Brown, Color Index No. 420, are quite readily fixed, whereas the dyeings of the Direct Blue, Color Index No. 401, which is a favorite component of cheap navy blue union mixtures, are fixed with difficulty. Ease of fixing also varies with the character of the material: dyed materials of all wool or practically all wool fix with less difficulty than dyed materials containing cotton and/or rayon, or composed entirely of cotton or rayon. The material appears to play a part, though an obscure one, in the fixing.

It will be evident to those skilled in the art that this solution of the fixing composition can be made either by dissolving a previously blended fixing composition, prepared according to the above principles, or by dissolving the separate ingredients in the correct proportions. It is understood that both methods of practicing the use of the fixing compositions are included in this invention. We believe it to be preferable to blend the ingredients before dissolving. It will also be understood that if desired the fixing compositions embodying the invention may be produced utilizing aluminum acetate (instead of aluminum sulphate and sodium acetate) together with the proper proportions of boric acid and of either sodium or potassium acetate as may be required to produce any particular formulation within the ranges specified.

This application is a continuation-in-part of our co-pending application Serial No. 235,566, filed July 6, 1951.

Having thus described the invention, what is claimed is:

1. A fixing composition for use in the after-treatment of dyed materials including dyed union materials comprising a water-soluble aluminum salt in the proportions of from 80 to 30 parts by weight modified by a reagent selected from the group consisting of sodium and potassium acetates and mixtures thereof in the proportions of from 20 to 60 parts by weight and embodying sufficient boric acid in the proportions of from 1 to 20 parts by weight to prevent hydrolysis and the formation of precipitated aluminum hydroxide and/or a basic aluminum salt.

2. A fixing composition for use in the after-treatment of dyed materials including dyed union materials comprising a water-soluble sulphate of aluminum in the proportions of from 80 to 30 parts by weight modified by a reagent selected from the group consisting of sodium and potassium acetates and mixtures thereof in the proportions of from 20 to 60 parts by weight and embodying sufficient boric acid in the proportions of from 1 to 20 parts by weight to prevent hydrolysis and the formation of precipitated aluminum hydroxide and/or a basic aluminum salt.

3. A fixing composition for use in the after-treatment of dyed materials including dyed union materials comprising the following materials in substantially the following proportions by weight:

| | |
|---|---|
| Aluminum sulphate | 75.0 |
| Sodium acetate anhydride | 21.0 |
| Boric acid | 4.0 |
| | 100.0 |

4. A fixing composition for use in the after-treatment of dyed materials including dyed union materials comprising the following materials in substantially the following proportions by weight:

| | |
|---|---|
| Aluminum sulphate | 71.5 |
| Sodium acetate anhydride | 26.5 |
| Boric acid | 2.0 |
| | 100.0 |

5. A fixing composition for use in the after-treatment of dyed materials including dyed union materials comprising the following materials in substantially the following proportions by weight:

| | |
|---|---|
| Aluminum sulphate | 57.0 |
| Sodium acetate anhydride | 41.0 |
| Boric acid | 2.0 |
| | 100.0 |

6. A fixing composition for use in the after-treatment of dyed materials including dyed union materials comprising the following materials in substantially the following proportions by weight:

| | |
|---|---|
| Aluminum sulphate | 54.0 |
| Sodium acetate anhydride | 39.0 |
| Boric acid | 7.0 |
| | 100.0 |

7. A fixing composition for use in the after-treatment of dyed materials including dyed union materials comprising the following materials in substantially the following proportions by weight:

| | |
|---|---|
| Aluminum sulphate | 34.0 |
| Sodium acetate anhydride | 60.0 |
| Boric acid | 6.0 |
| | 100.0 |

8. A fixing composition for use in the after-treatment of dyed materials including dyed union materials comprising the following materials in substantially the following proportions by weight:

| | |
|---|---|
| Aluminum sulphate | From 80 to 30 parts by weight. |
| Sodium or potassium acetate (anhydride) | From 20 to 60 parts by weight. |
| Boric acid | From 1 to 20 parts by weight. |

9. A fixing composition as defined in claim 8 wherein the composition is in the form of an aqueous solution of concentrations lying within the range of 1 part fixing composition to 10 parts of water and from 1 part fixing composition to 100 parts of water.

10. A precipitate-free fixing solution for use in the after-treatment of dyed materials including dyed union materials comprising an aqueous solution of a water-soluble sulphate of aluminum modified by a reagent selected from the group consisting of sodium and potassium acetates and mixtures thereof and embodying sufficient boric acid to prevent hydrolysis and the formation of precipitated aluminum hydroxide, and a basic aluminum salt wherein the concentration of the fixing solution lies within the range of from 1 part fixing composition to 10 parts of water and from 1 part fixing composition to 100 parts of water.

References Cited in the file of this patent

UNITED STATES PATENTS

| | | |
|---|---|---|
| 143,449 | Hagemann | Oct. 7, 1873 |
| 2,154,170 | Kramer | Apr. 11, 1939 |

FOREIGN PATENTS

| | | |
|---|---|---|
| 17,701 | Great Britain | 1900 |